US009846816B2

(12) United States Patent
Chang

(10) Patent No.: US 9,846,816 B2
(45) Date of Patent: Dec. 19, 2017

(54) IMAGE SEGMENTATION THRESHOLD VALUE DECIDING METHOD, GESTURE DETERMINING METHOD, IMAGE SENSING SYSTEM AND GESTURE DETERMINING SYSTEM

(71) Applicant: PixArt Imaging Inc., Hsin-Chu (TW)

(72) Inventor: Bo-Yi Chang, Hsin-Chu (TW)

(73) Assignee: PixArt Imaging Inc., Hsin-Chu (TW)

( * ) Notice: Subject to any disclaimer, the term of this patent is extended or adjusted under 35 U.S.C. 154(b) by 55 days.

(21) Appl. No.: 15/173,555

(22) Filed: Jun. 3, 2016

(65) Prior Publication Data

US 2017/0116742 A1   Apr. 27, 2017

(30) Foreign Application Priority Data

Oct. 26, 2015  (TW) .............................. 104135154 A

(51) Int. Cl.
| | |
|---|---|
| *G06T 7/00* | (2017.01) |
| *G06K 9/32* | (2006.01) |
| *G06K 9/00* | (2006.01) |
| *G06T 7/11* | (2017.01) |
| *G06T 7/143* | (2017.01) |
| *G06T 7/44* | (2017.01) |
| *G06T 7/62* | (2017.01) |
| *G06T 7/136* | (2017.01) |

(52) U.S. Cl.
CPC ....... *G06K 9/3233* (2013.01); *G06K 9/00355* (2013.01); *G06T 7/11* (2017.01); *G06T 7/136* (2017.01); *G06T 7/143* (2017.01); *G06T 7/44* (2017.01); *G06T 7/62* (2017.01); *G06T 2207/30196* (2013.01)

(58) Field of Classification Search
CPC ....................................................... G06T 7/00
See application file for complete search history.

(56) References Cited

U.S. PATENT DOCUMENTS 4,879,753 A  * 11/1989 El-Sherbini ........ H04N 1/40062
                                                          358/1.9
5,805,970 A  *  9/1998 Kasamatsu .......... G03G 15/607
                                                          358/449
(Continued)

FOREIGN PATENT DOCUMENTS

| CN | 101661556 A | 3/2010 |
|---|---|---|
| TW | 201009766 | 3/2010 |

(Continued)

*Primary Examiner* — Anand Bhatnagar
(74) *Attorney, Agent, or Firm* — Winston Hsu

(57) ABSTRACT

An image segmentation threshold value determining method, comprising: defining a plurality of image regions of a first sensing image; determining a first, a second part image segmentation threshold values according to a first, second image regions of the image regions; performing a first, a second image segmentation operation to the first sensing image according to the first, the second part image segmentation threshold values to acquire a first, a second segmented images; and selecting one of the first part image segmentation threshold value and the second part image segmentation threshold value as the first image segmentation threshold value according to the first segmented image and the second segmented image.

20 Claims, 9 Drawing Sheets

(56) References Cited

U.S. PATENT DOCUMENTS

| | | | | |
|---|---|---|---|---|
| 7,088,857 B2* | 8/2006 | Zuniga | ................ | G06K 9/38 |
| | | | | 382/172 |
| 7,653,242 B2* | 1/2010 | Haque | ................ | G06K 9/38 |
| | | | | 358/3.22 |
| 9,098,769 B2* | 8/2015 | Liu | ................ | G06K 9/3241 |
| 2003/0113003 A1* | 6/2003 | Cline | ................ | G06T 7/0012 |
| | | | | 382/128 |
| 2003/0142866 A1* | 7/2003 | Zuniga | ................ | G06K 9/38 |
| | | | | 382/171 |
| 2004/0001632 A1* | 1/2004 | Adachi | ................ | G06K 9/6814 |
| | | | | 382/224 |
| 2011/0128354 A1* | 6/2011 | Tien | ................ | G06T 7/80 |
| | | | | 348/50 |
| 2013/0286139 A1* | 10/2013 | Furuki | ................ | B41J 2/325 |
| | | | | 347/217 |
| 2015/0193655 A1* | 7/2015 | Vodrahalli | ........ | G06K 9/00389 |
| | | | | 382/103 |
| 2016/0070949 A1* | 3/2016 | Tunstall | ................ | G06K 9/0014 |
| | | | | 382/133 |

FOREIGN PATENT DOCUMENTS

| | | |
|---|---|---|
| TW | 201248543 A1 | 12/2012 |
| TW | 201339895 A | 10/2013 |
| TW | 201401181 A | 1/2014 |
| TW | 201419168 A | 5/2014 |
| TW | 201430720 A | 8/2014 |

\* cited by examiner

IMAGE SEGMENTATION THRESHOLD VALUE DECIDING METHOD, GESTURE DETERMINING METHOD, IMAGE SENSING SYSTEM AND GESTURE DETERMINING SYSTEM

BACKGROUND OF THE INVENTION

1. Field of the Invention

The present invention relates to an image segmentation threshold value deciding method, an image sensing system, a gesture determining method, and a gesture determining system, and particularly relates to an image sensing system, a gesture determining method, and a gesture determining system which can dynamically adjust the image segmentation threshold value.

2. Description of the Prior Art

More and more electronic apparatuses can perform different functions according to a user's gestures (ex. a smart phone and a smart TV). However, if it is desired to correctly detect a gesture, a location for a hand must be detected before performing such operation. Generally, if a depth sensor is not provided, image segmentation should be firstly performed to determine a hand image from images captured by the image sensor. A common image segmentation method is performed based on brightness.

FIG. 1A and FIG. 1B are schematic diagrams illustrating a prior art operation for performing image segmentation to an image according to brightness. As illustrated in FIG. 1A, the sensing image Img captured by the image sensor comprises a hand image Img_h and a background image Img_b. Also, in FIG. 1B, image segmentation has been performed to the sensing image Img, thus a segmented image Img_s is generated. A common image segmentation method gives a higher brightness (ex. a grey level 255) to at least part for a sensing image, if the part for a sensing image is higher than an image segmentation threshold value. Oppositely, the common image segmentation method gives a lower brightness (ex. a grey level 0) to at least part for a sensing image, if the part for a sensing image is lower than the image segmentation threshold value. As illustrated in FIG. 1B, after image segmentation, the segmented hand image Img_hs in the segmented image Img_s has a higher brightness, and the segmented background image Img_bs has a lower brightness. Accordingly, the hand image can be correctly determined after the sensing image is segmented.

However, the methods in FIG. 1A and FIG. 1B may generate an incorrect segmented hand image under some situations. FIG. 2A and FIG. 2B are schematic diagrams illustrating that the background image has interference while conventional image segmentation is performed according to brightness. As illustrated in FIG. 2A, the sensing image Img captured by the image sensor comprises a hand image Img_h and a background image Img_b. Also, the background image Img_b further comprises an object image Img_o, which has brightness close to brightness of the hand image Img_h. Accordingly, in FIG. 2B, the segmented hand image Img_hs and the segmented object image Img_os have the same brightness. For such case, the size and the location of the hand image may be mis-determined.

Besides FIG. 2A and FIG. 2B, the methods in FIG. 1A and FIG. 1B may have the above-mentioned fragile hand issue. FIG. 3 is a schematic diagram illustrating that a fragile hand image is generated while conventional image segmentation is performed according to brightness. FIG. 3 can be acquired via performing image segmentation to FIG. 1A. However, the segmented hand image Img_hs may become an incomplete image due to an unsuitable threshold value or interference of environment light. For such case, the size and the location of the hand image may also be mis-determined.

SUMMARY OF THE INVENTION

Therefore, one objective of the present invention is to provide an image segmentation deciding method, which can dynamically decide a best threshold value.

Another objective of the present invention is to provide a gesture determining method, which can apply an image segmentation threshold value deciding method provided by the present invention to perform segmentation to the image. By this way, the gesture can be determined more accurately.

Another objective of the present invention is to provide an image sensing system applying the image segmentation deciding method provided by the present invention and to provide a gesture determining system applying the gesture determining method provided by the present invention, One embodiment of the present invention provides an image segmentation threshold value deciding method, which is applied to an image sensor, for deciding a first image segmentation threshold value of the image sensor. The image segmentation threshold value deciding method comprises: (a) defining at least one image region of a first sensing image; (b) deciding a first part image segmentation threshold value according to a first image region from the image regions; (c) deciding a second part image segmentation threshold value according to a second image region from the image regions; (d) performing a first image segmentation operation to the first sensing image via the first part image segmentation threshold value to acquire a first segmented image; (e) performing a second image segmentation operation to the first sensing image via the second part image segmentation threshold value to acquire a second segmented image; (f) selecting one of the first part image segmentation threshold value and the second part image segmentation threshold value as the first image segmentation threshold value according to the first segmented image and the second segmented image.

One embodiment of the present invention provides a gesture determining method applying the above-mentioned image segmentation threshold value deciding method. The gesture determining method further comprises steps (g) and (h) besides the above-mentioned steps (a)-(f), which are as follows: (g) controlling the image processor applies the first image segmentation threshold value to process at least one sensing image captured by the image sensor to generate at least one segmented sensing image; and (h) determining a gesture that the sensing image indicates according to the segmented sensing image.

In view of above-mentioned embodiments, the image segmentation threshold value can be dynamically adjusted such that the image segmentation threshold value can be optimized. By this way, a better segmented image can be acquired. If this method is applied for gesture determining, a more accurate gesture determining result can be acquired.

These and other objectives of the present invention will no doubt become obvious to those of ordinary skill in the art after reading the following detailed description of the preferred embodiment that is illustrated in the various figures and drawings.

DETAILED DESCRIPTION

Figure 1A:
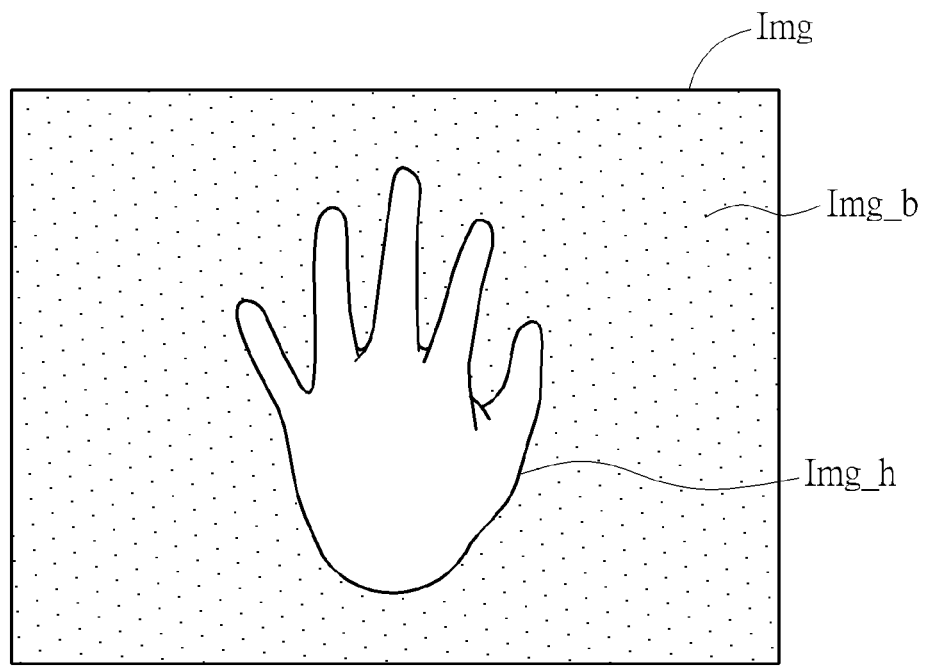
FIG. 1A and FIG. 1B are schematic diagrams illustrating a prior art operation for performing image segmentation to an image according to brightness.
Figure 1B:
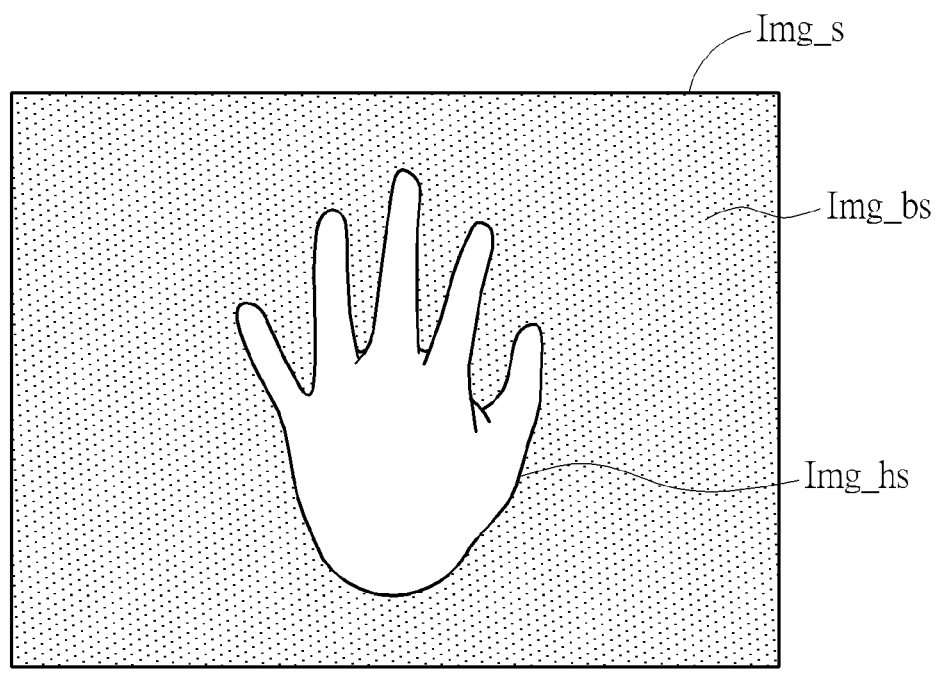
Figure 2A:
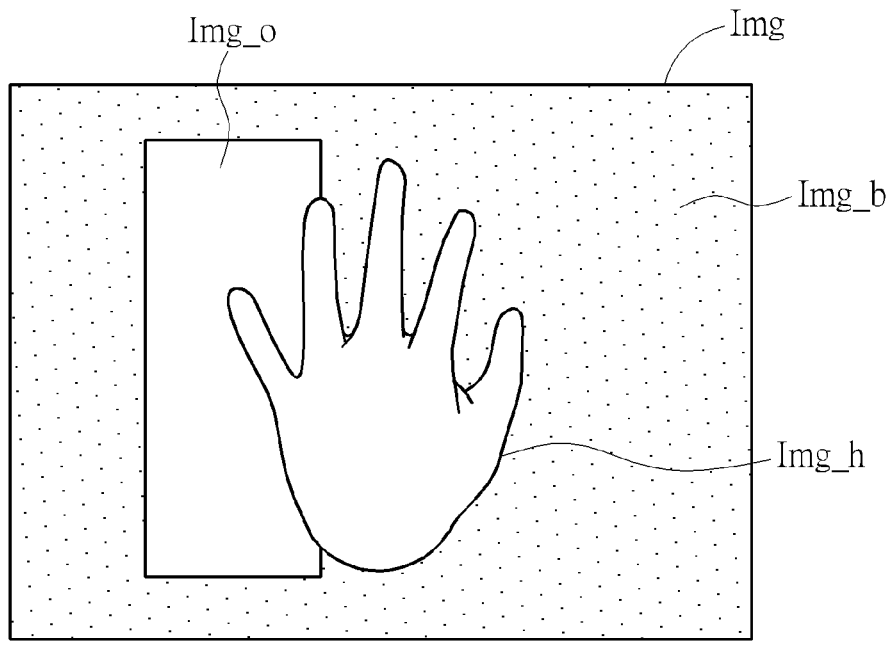
FIG. 2A and FIG. 2B are schematic diagrams illustrating that the background image has interference while a conventional image segmentation is performed according to brightness.
Figure 2B:
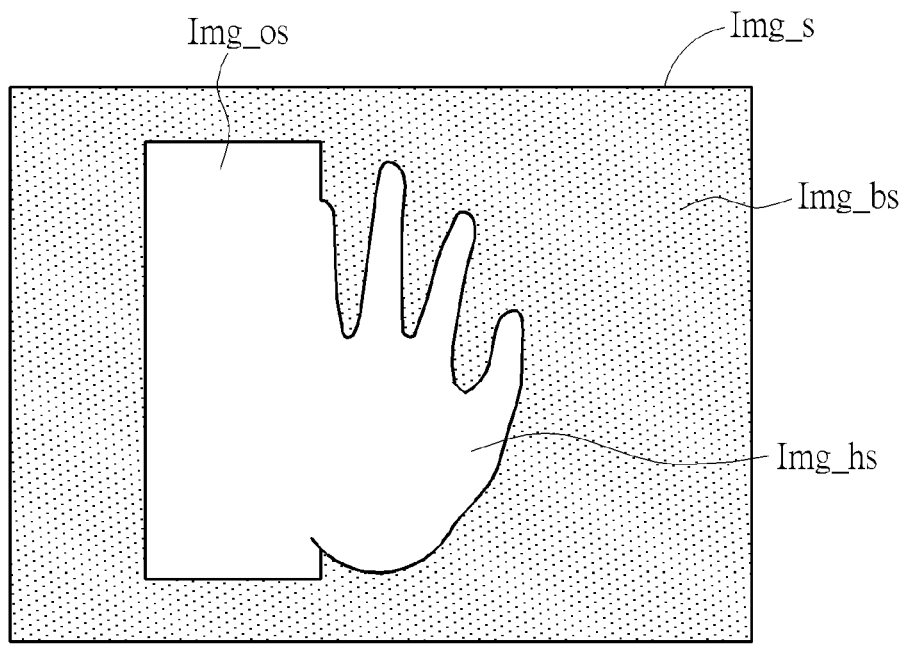
Figure 3:
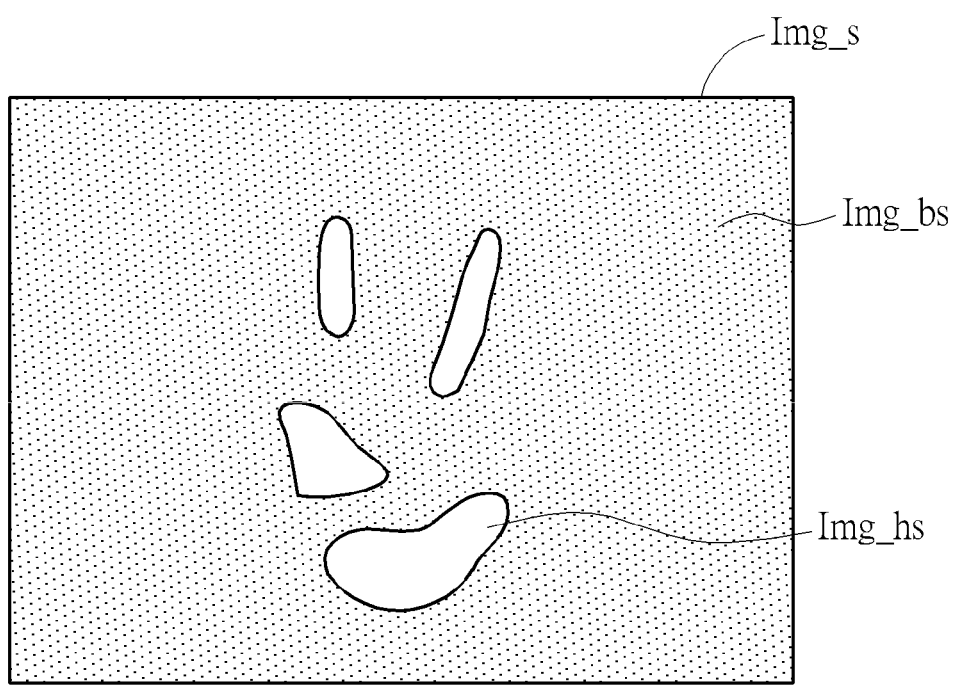
FIG. 3 is a schematic diagram illustrating that a fragile hand image is generated while conventional image segmentation is performed according to brightness.
Figure 4:
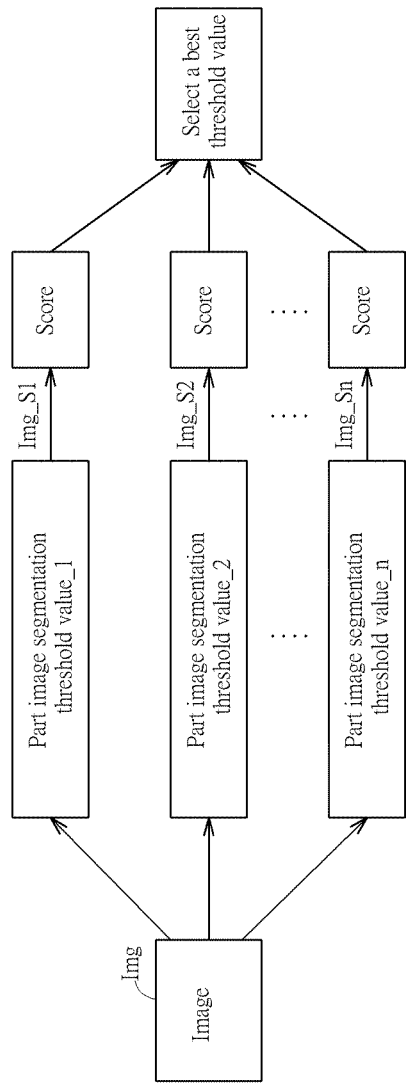
FIGS. 4-6 and FIG. 9 are schematic diagrams illustrating an image segmentation threshold value deciding method according to embodiments of the present invention.
Figure 5:
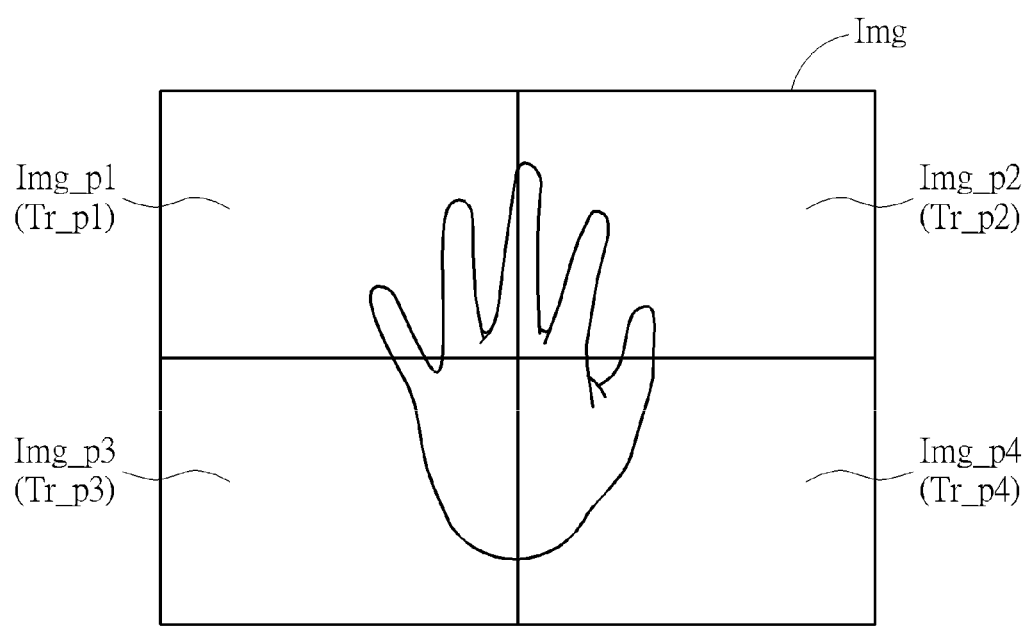
Figure 6:
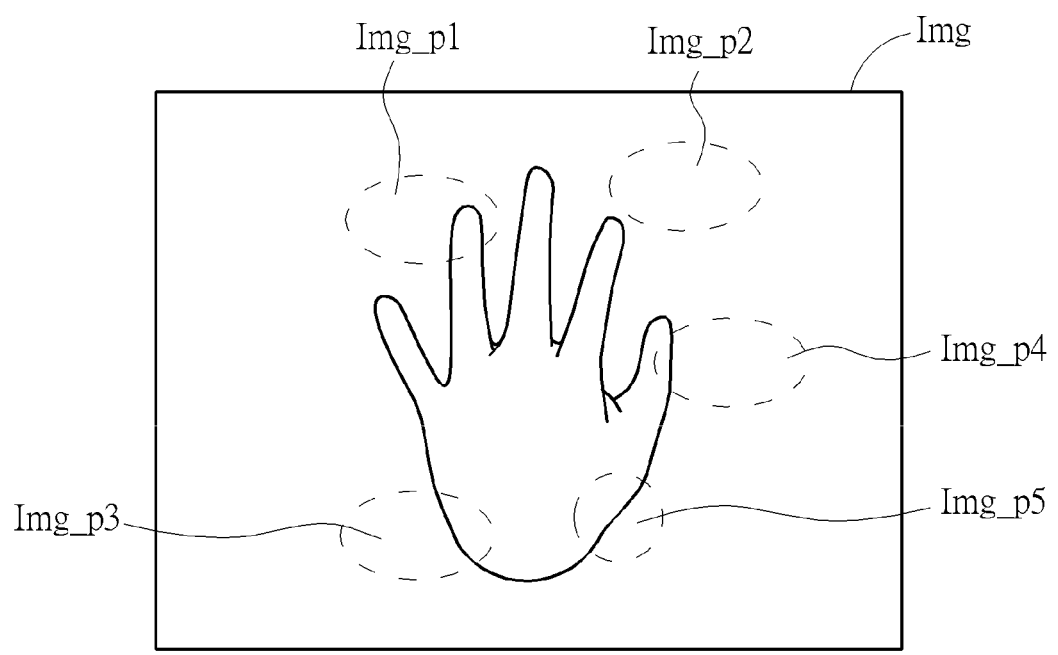

FIGS. 4-6 are schematic diagrams illustrating an image segmentation threshold value deciding method according to embodiments of the present invention. As illustrated in FIG. 4, if the mechanism for adjusting the image segmentation threshold value is activated, a plurality of image regions are defined for the image sensed by the image sensor. After that, corresponding part image segmentation threshold values are decided according to the image regions (ex. part image segmentation value_1, part image segmentation value_2 . . . part image segmentation value_n). Then, image segmentation operations are provided to the image respectively according to the part image segmentation values to generate segmented images Img_s1, Imag_s2 . . . Img_sn. Next, scores for these segmented images Img_s1, Imag_s2 . . . Img_sn are computed. After that, a part image segmentation value corresponding to the segmented image with a highest score is selected as a desired image segmentation threshold value.

More details for each step are illustrated as below. FIG. 5 is a schematic diagram illustrating performing image segmentation to an image sensed by the image sensor. As illustrated in FIG. 5, a plurality of image regions Img_p1, Img_p2, Img_p3 and Img_p4 are defined for the image Img. After that, corresponding part image segmentation threshold values Tr_p1, Tr_p2, Tr_p3 and tr_P4 are decided according to the image regions Img_p1, Img_p2, Img_p3 and Img_p4. Many methods can be applied to decide corresponding part image segmentation threshold values Tr_p1, Tr_p2, Tr_p3 and Tr_P4 according to the image regions Img_p1, Img_p2, Img_p3 and Img_p4. In one embodiment, average brightness for the image regions Img_p1, Img_p2, Img_p3 and Img_p4 is applied to decide corresponding part image segmentation threshold values Tr_p1, Tr_p2, Tr_p3 and Tr_P4. Next, as above-mentioned, image segmentation operations are provided to the image Img respectively according to the part image segmentation values Tr_p1, Tr_p2, Tr_p3 and Tr_P4. Also, scores for different segmented images are computed to select a best part image segmentation value as a desired image segmentation threshold value.

Please note, other parameters for image regions Img_p1, Img_p2, Img_p3 and Img_p4 can be applied to decide corresponding part image segmentation values Tr_p1, Tr_p2, Tr_p3 and Tr_P4. For example, a maximum brightness, a minimum brightness, or brightness changing tendency can be applied to decide corresponding part image segmentation values Tr_p1, Tr_p2, Tr_p3 and Tr_P4. Moreover, the locations, numbers and sizes for image regions are not limited to examples in FIG. 5. For example, a number for the image regions in FIG. 5 is 4 and the image regions can be combined to form a whole region for the image Img. However, in the embodiment of FIG. 6, a number for the image regions is 5 and the combination for image regions only form part of the image Img. Additionally, the image regions can have overlapped parts. Such variation should also fall in the scope of the present invention.

Many methods can be applied to implement above-mentioned score computing operations. For example, apply shape analyzing or texture analyzing. Shape analyzing means comparing the segmented image processed by the part image segmentation threshold value and the pre-stored standard image. By this way, it can be acknowledged that which segmented image has a highest similarity with the pre-stored standard image, and such segmented image has a higher grade. The texture analyzing means analyzing brightness changing tendency for the segmented image processed by the part image segmentation threshold. If the tendency matches a pre-stored changing rule, the segmented image gets a high grade.

Figure 9:
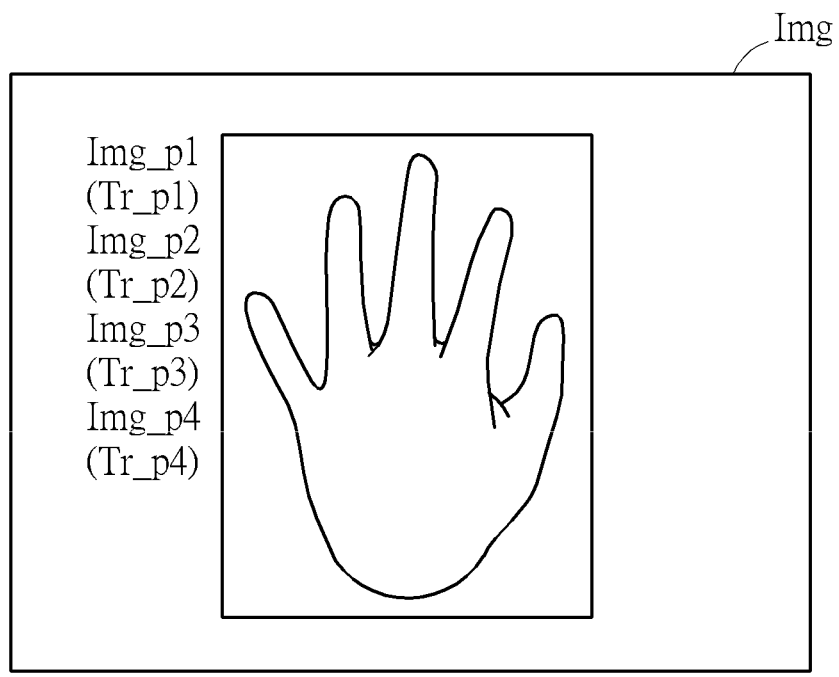

Please note, in the embodiments of FIG. 5 and FIG. 6, different image regions Img_p1, Img_p2, Img_p3 and Img_p4 are applied to generate different part image segmentation threshold values Tr_p1, Tr_p2, Tr_p3 and Tr_p4. However, in another embodiment, the same image region can be applied to generate different part image segmentation threshold values Tr_p1, Tr_p2, Tr_p3 and Tr_p4. FIG. 9 is a schematic diagram illustrating an image segmentation threshold value deciding method according to an embodiment of the present invention. As illustrated in FIG. 9, the image regions Img_p1, Img_p2, Img_p3 and Img_p4 mean the same image region. In this embodiment, this image region is applied to generate different part image segmentation threshold values Tr_p1, Tr_p2, Tr_p3 and Tr_p4.

Many methods can be applied to generate part image segmentation threshold values Tr_p1, Tr_p2, Tr_p3 and Tr_p4. In one embodiment, after a part image segmentation threshold value is acquired, multiplying this part image segmentation threshold value with an adjusting ratio to generate other part image segmentation threshold values. For example, the part image segmentation threshold value Tr_p1 is firstly acquired, and then respectively multiplying values 1.1, 0.9 and 0.8 to generate part image segmentation threshold values Tr_p2, Tr_p3 and Tr_p4. Alternatively, different brightness information for a single image region can be applied to generate different part image segmentation threshold values. For example, the average brightness for the image region is applied to generate the part image segmentation threshold value Tr_p1, and then a maximum brightness for the same image region is applied to generate the part image segmentation threshold value Tr_p2. Also, a minimum brightness for the same image region is applied to generate the part image segmentation threshold value Tr_p3. However, please note, these examples are only for explaining the concept of the present invention, and do not mean to limit the scope of the present invention. Other methods for generating different part image segmentation threshold values via the same image region should also fall in the scope of the present invention.

Figure 7:
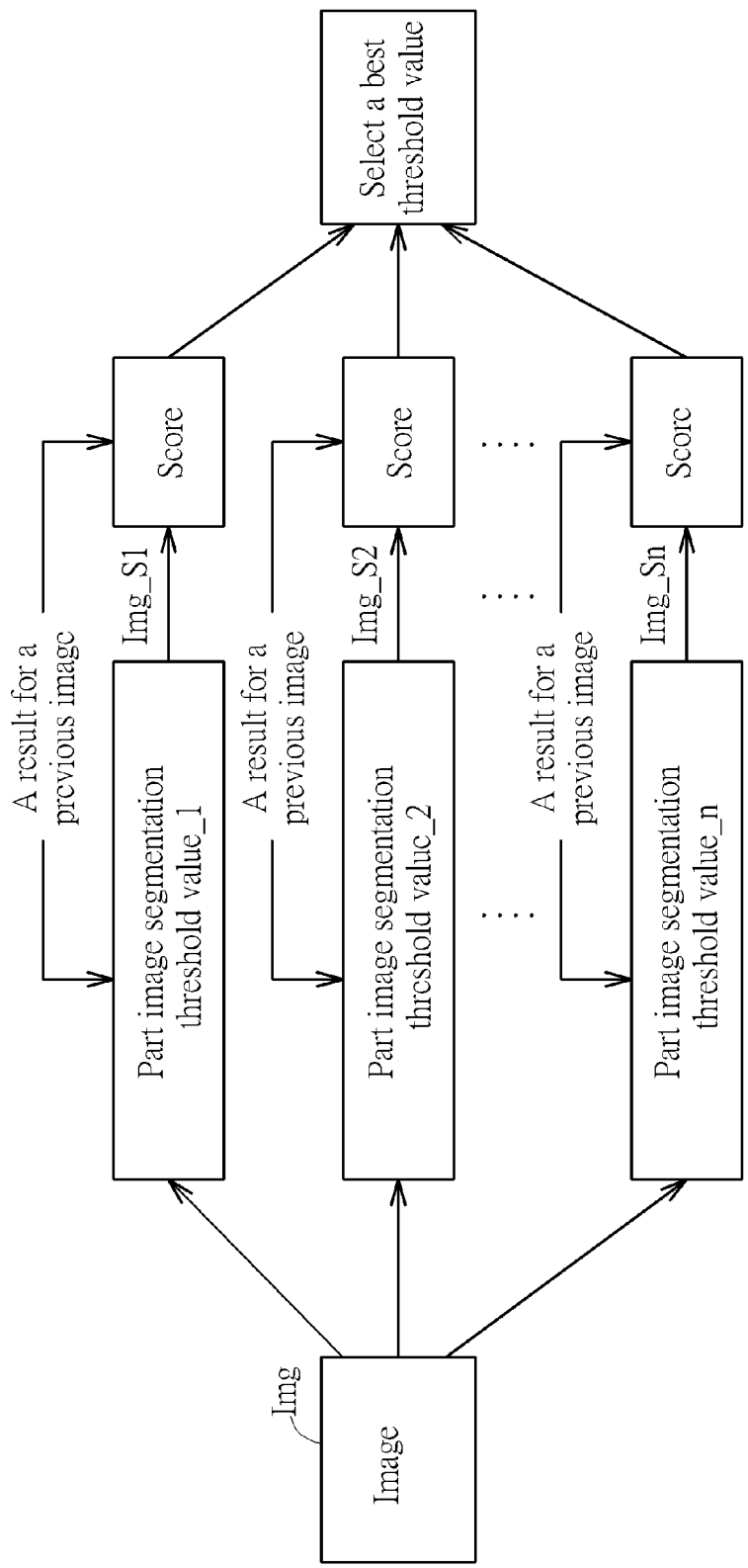
FIG. 7 is a schematic diagram illustrating an image segmentation threshold value deciding method according to another embodiment of the present invention.

Besides the current image, in one embodiment, a previous image is applied to decide the part image segmentation threshold value or score. Please refer to FIG. 7, in which a previous image is applied to decide the part image segmentation threshold value or score. For example, the image segmentation threshold value for a whole previous image is applied to decide the part image segmentation threshold value for a current image. Also, the score for the previous image is applied to decide scores for different segmented images which are generated via different part image segmentation threshold values. The "decide" here can mean a new value is directly decided based on a previous image, or mean adjusting the part image segmentation threshold value and score that are already acquired, according to a previous image. The reason for applying a previous image to decide the part image segmentation threshold value or score is: if difference between the timing for the previous image and the timing for the current image is small, the contents for the previous image and the current image are similar. Therefore, a previous image can be applied to decide the part image segmentation threshold value or the score to save computing time or to avoid errors. Please note, the previous image here means an image previous to the current image for n images, which is a positive integer.

In view of above-mentioned embodiments, an image segmentation threshold value deciding method can be acquired. The method is applied to an image sensor, for deciding a first image segmentation threshold value of the image sensor. This image segmentation threshold value deciding comprises: (a) defining at least one image region of a first sensing image (ex. Img_p1, Img_p2 in FIG. 5 or FIG. 9); (b) deciding a first part image segmentation threshold value according to a first image region from the image regions (ex. Tr_p1 in FIG. 5); (c) deciding a second part image segmentation threshold value according to a second image region from the image regions (ex. Tr_p2 in FIG. 5); (d) performing a first image segmentation operation to the first sensing image via the first part image segmentation threshold value to acquire a first segmented image; (e) performing a second image segmentation operation to the first sensing image via the second part image segmentation threshold value to acquire a second segmented image; (f) selecting one of the first part image segmentation threshold value and the second part image segmentation threshold value as the first image segmentation threshold value according to the first segmented image and the second segmented image.

Figure 8:
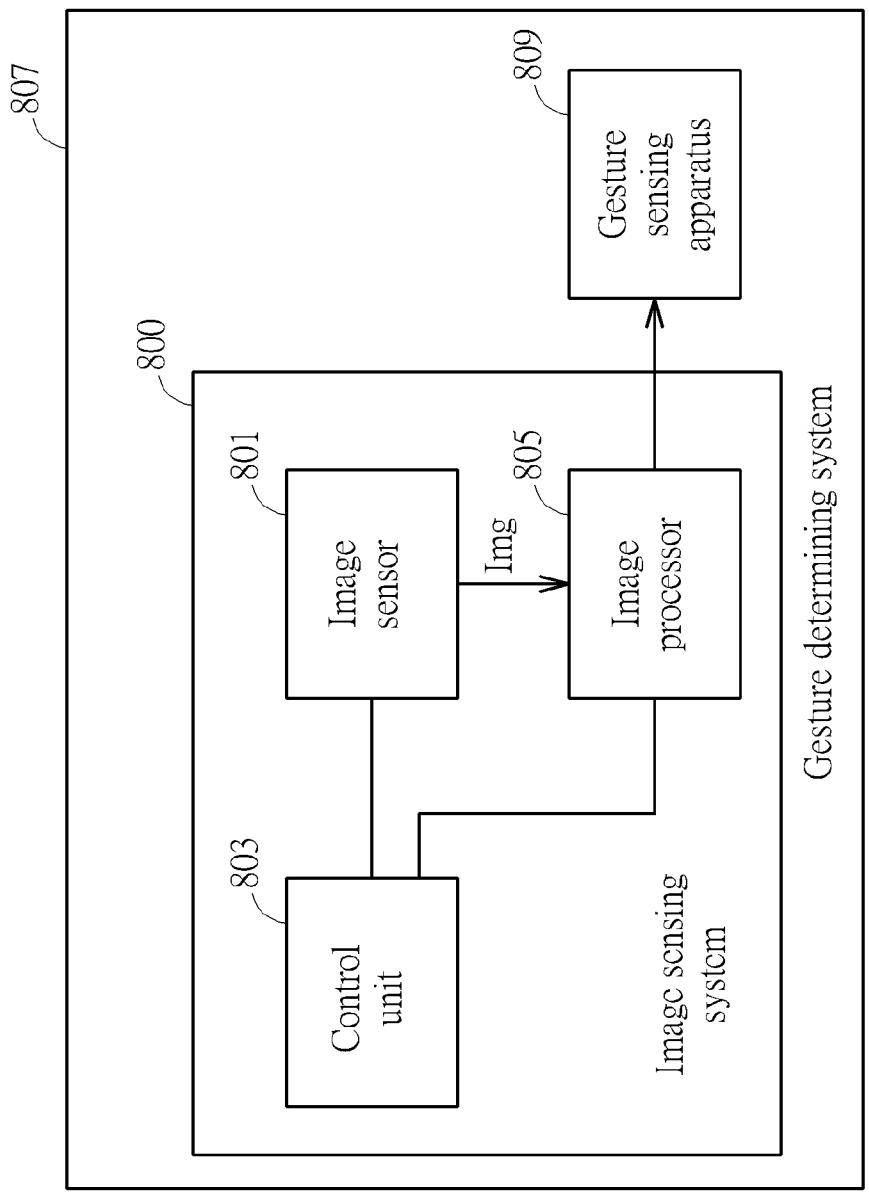
FIG. 8 is a block diagram illustrating a gesture determining method and an image sensing system according to embodiments of the present invention.

FIG. 8 is a block diagram illustrating a gesture determining method and an image sensing system according to embodiments of the present invention. Please note, the block diagram in FIG. 8 is only for the convenience of explaining. The structures for the gesture determining system and the image sensing system which can apply the image segmentation threshold value deciding method provided by the present invention are not limited to the structured illustrated in FIG. 8. For example, the control unit 803 in FIG. 8 can be integrated to the image sensor 801 or the image processor 805. Additionally, all devices in FIG. 8 can be implemented by hardware (ex. circuit) or firmware.

As illustrated in FIG. 8, the image sensing system 800 comprises: an image sensor 801, a control unit 803 and an image processor 805. The control unit 803 is applied to control operations for the image sensor 801 and the image processor 805. The image sensor 801 is configured to capture a sensing image Img. The image processor 805 is configured to define a plurality of image regions and to decide a plurality of part image segmentation threshold values (ex. example in FIG. 5). The image processor 805 generates corresponding segmented images according to these part image segmentations values, and decides an image segmentation threshold value according to these augmented images. Then, the image processor 805 accordingly process sensing images captured by the image sensor 801, which can comprises the current sensing image Img to generate segmented sensing images. In one embodiment, the image processor 805 can operate in a normal mode or an adjusting mode. In the normal mode, the image processor 805 generates corresponding segmented images according to pre-set image segmentation threshold values. Also, in the adjusting mode, the image processor 805 generates a plurality of part image segmentation threshold values and then decides a best image segmentation values, as above-mentioned description. In one embodiment, a trigger mechanism is also provided, to switch the image processor 805 from the normal mode to the adjusting mode. For example, the image quality for the segmented image generated by the image processor 805 can be continuously monitored. For such case, the image processor 805 is switched from the normal mode to the adjusting mode if the image quality is too low (ex. acquire a low grade).

Please refer to FIG. 8 again, in one embodiment, the image sensing system 800 is included in a gesture determining system 807. In such case, the segmented sensing images generated by the image process 805 is output to a gesture sensing apparatus 809, which decides a location for the hand image according to segmented sensing images. After that, the gesture indicated by the hand image is acquired. It will be appreciated that the image sensing system 800 provided by the present invention can be provided to any electronic apparatuses.

In view of above-mentioned embodiments, the image segmentation threshold value can be dynamically adjusted such that the image segmentation threshold value can be optimized. By this way, a better segmented image can be acquired. If this method is applied for gesture determining, a more accurate gesture determining result can be acquired.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An image segmentation threshold value deciding method, applied to an image sensor, for deciding a first image segmentation threshold value of the image sensor, comprising:
    (a) defining at least one image region of a first sensing image;
    (b) deciding a first part image segmentation threshold value according to a first image region from the image regions;
    (c) deciding a second part image segmentation threshold value according to a second image region from the image regions;
    (d) performing a first image segmentation operation to the first sensing image via the first part image segmentation threshold value to acquire a first segmented image;
    (e) performing a second image segmentation operation to the first sensing image via the second part image segmentation threshold value to acquire a second segmented image;
    (f) selecting one of the first part image segmentation threshold value and the second part image segmentation threshold value as the first image segmentation threshold value according to the first segmented image and the second segmented image.

2. The image segmentation threshold value deciding method of claim 1, wherein the step (f) comprises computing a score for the first segmented image and computing a score for the second segmented image, wherein the step (f) selects one of the first part image segmentation threshold value and the second part image segmentation threshold value as the first image segmentation threshold value according to the score for the first segmented image and the score for the second segmented image.

3. The image segmentation threshold value deciding method of claim 2, wherein the step (f) computes the score for the first segmented image and computes the score for the second segmented image via shape analyzing.

4. The image segmentation threshold value deciding method of claim 2, wherein the step (f) computes the score for the first segmented image and computes the score for the second segmented image via texture analyzing.

5. The image segmentation threshold value deciding method of claim 2, wherein the step (f) further comprises:
  computing a score for a second sensing image; and
  adjusting at least one of the score for the first segmented image and the score for the second segmented image referring to the score for the second sensing image;
  wherein the second sensing image is an image previous to the first sensing image for n images, wherein the n is a positive integer.

6. The image segmentation threshold value deciding method of claim 1, wherein the step (b) further comprises:
  deciding the first part image segmentation threshold value referring to a second image segmentation threshold value of a second sensing image, wherein the second sensing image is an image previous to the first sensing image for n images, wherein the n is a positive integer.

7. The image segmentation threshold value deciding method of claim 1, wherein the first image region and the second image region are identical image regions.

8. A gesture deciding method, applied to a gesture deciding system comprising an image processor and an image sensor, comprising:
  (a) defining at least one image region of a first sensing image;
  (b) deciding a first part image segmentation threshold value according to a first image region from the image regions;
  (c) deciding a second part image segmentation threshold value according to a second image region from the image regions;
  (d) performing a first image segmentation operation to the first sensing image via the first part image segmentation threshold value to acquire a first segmented image;
  (e) performing a second image segmentation operation to the first sensing image via the second part image segmentation threshold value to acquire a second segmented image;
  (f) selecting one of the first part image segmentation threshold value and the second part image segmentation threshold value as a first image segmentation threshold value of the image sensor according to the first segmented image and the second segmented image;
  (g) controlling the image processor applies the first image segmentation threshold value to process at least one sensing image captured by the image sensor to generate at least one segmented sensing image; and
  (h) determining a gesture that the sensing image indicates according to the segmented sensing image.

9. The gesture deciding method of claim 8, wherein the step (f) comprises computing a score for the first segmented image and computing a score for the second segmented image, wherein the step (f) selects one of the first part image segmentation threshold value and the second part image segmentation threshold value as the first image segmentation threshold value according to the score for the first segmented image and the score for the second segmented image.

10. The gesture deciding method of claim 9, wherein the step (f) computes the score for the first segmented image and computes the score for the second segmented image via shape analyzing.

11. The gesture deciding method of claim 9, wherein the step (f) computes the score for the first segmented image and computes the score for the second segmented image via texture analyzing.

12. The gesture deciding method of claim 9, wherein the step (f) further comprises:
  computing a score for a second sensing image; and
  adjusting at least one of the score for the first segmented image and the score for the second segmented image referring to the score for the second sensing image;
  wherein the second sensing image is an image previous to the first sensing image for n images, wherein the n is a positive integer.

13. The gesture deciding method of claim 8, wherein the step (b) further comprises:
  deciding the first part image segmentation threshold value referring to a second image segmentation threshold value of a second sensing image, wherein the second sensing image is an image previous to the first sensing image for n images, wherein the n is a positive integer.

14. The gesture deciding method of claim 8, wherein the first image region and the second image region are identical image regions.

15. An image sensing system, comprising:
  an image sensor, configured to sense a first sensing image;
  an image processor, configured to perform following steps:
  (a) defining at least one image region of a first sensing image;
  (b) deciding a first part image segmentation threshold value according to a first image region from the image regions;
  (c) deciding a second part image segmentation threshold value according to a second image region from the image regions;
  (d) performing a first image segmentation operation to the first sensing image via the first part image segmentation threshold value to acquire a first segmented image;
  (e) performing a second image segmentation operation to the first sensing image via the second part image segmentation threshold value to acquire a second segmented image;
  (f) selecting one of the first part image segmentation threshold value and the second part image segmentation threshold value as the first image segmentation threshold value according to the first segmented image and the second segmented image.

16. The image sensing system of claim 15, wherein the step (f) comprises computing a score for the first segmented image and computing a score for the second segmented image, wherein the step (f) selects one of the first part image segmentation threshold value and the second part image segmentation threshold value as the first image segmentation threshold value according to the score for the first segmented image and the score for the second segmented image.

17. The image sensing system of claim 16, wherein the step (f) computes the score for the first segmented image and computes the score for the second segmented image via shape analyzing.

18. The image sensing system of claim 16, wherein the step (f) computes the score for the first segmented image and computes the score for the second segmented image via texture analyzing.

19. The image sensing system of claim 16, wherein the step (f) further comprises:
   computing a score for a second sensing image; and
   adjusting at least one of the score for the first segmented image and the score for the second segmented image referring to the score for the second sensing image;
   wherein the second sensing image is an image previous to the first sensing image for n images, wherein the n is a positive integer.

20. The image sensing system of claim 15, wherein the step (b) further comprises:
   deciding the first part image segmentation threshold value referring to a second image segmentation threshold value of a second sensing image, wherein the second sensing image is an image previous to the first sensing image for n images, wherein the n is a positive integer.

\* \* \* \* \*